United States Patent
Millsaps (10) Patent No.: US 8,327,042 B2
(45) Date of Patent: Dec. 4, 2012

(54) AUTOMATIC PORT ACCUMULATION

(75) Inventor: Christopher R. Millsaps, Hayward, CA (US)

(73) Assignee: PLX Technology, Inc., Sunnyvale, CA (US)

( * ) Notice: Subject to any disclaimer, the term of this patent is extended or adjusted under 35 U.S.C. 154(b) by 0 days.

(21) Appl. No.: 12/875,500

(22) Filed: Sep. 3, 2010

(65) Prior Publication Data

US 2012/0059957 A1    Mar. 8, 2012

(51) Int. Cl.
*G06F 3/00* (2006.01)
*G06F 15/16* (2006.01)

(52) U.S. Cl. ............. 710/46; 710/36; 709/217; 709/228

(58) Field of Classification Search .................. None
See application file for complete search history.

(56) References Cited

U.S. PATENT DOCUMENTS

| | | | | |
|---|---|---|---|---|
| 6,816,560 | B1 * | 11/2004 | Spalink | 375/368 |
| 7,907,630 | B1 * | 3/2011 | Bicknell | 370/467 |
| 2005/0270988 | A1 * | 12/2005 | DeHaemer | 370/254 |
| 2006/0041696 | A1 * | 2/2006 | Cherukuri et al. | 710/100 |
| 2006/0164072 | A1 * | 7/2006 | Ng et al. | 324/158.1 |
| 2007/0011536 | A1 * | 1/2007 | Khanna et al. | 714/733 |
| 2007/0159653 | A1 * | 7/2007 | Dholakia et al. | 358/1.15 |
| 2008/0282069 | A1 * | 11/2008 | Klemin et al. | 712/220 |

* cited by examiner

*Primary Examiner* — Henry Tsai
*Assistant Examiner* — Michael Sun
(74) *Attorney, Agent, or Firm* — Beyer Law Group LLP (57) ABSTRACT

In a first embodiment of the present invention, a method for configuring a plurality of input/output (I/O) interconnect switch ports is provided, the method comprising: starting a link training and status state machine (LTSSM) for each of the plurality of ports; placing each of the LTSSMs in a receiver detect state; changing all of the LTSSMs to a polling state only once receivers are detected or timeouts occur in the receiver detect states in each of the LTSSMs; changing all of the LTSSMs to a configuration state only once polling is successful or timeouts occur in the polling states in each of the LTSSMs; and completing the configuration state of each of the LTSSMs.

18 Claims, 6 Drawing Sheets

FIG. 1

(Prior Art)

AUTOMATIC PORT ACCUMULATION

BACKGROUND OF THE INVENTION

1. Field of the Invention

The present invention relates generally to computers. More specifically, the present invention relates to the automatic accumulation of ports of a switch.

2. Description of the Related Art

There are many different computer Input/Output (I/O) interconnect standards available. One of the most popular over the years has been the Peripheral Component Interconnect (PCI) standard. PCI allows a bus to act like a bridge, which isolates a local processor bus from the peripherals, allowing a Central Processing Unit (CPU) of the computer to run must faster.

Recently, a successor to PCI has been popularized. Termed PCI Express (or, simply, PCIe), PCIe provides higher performance, increased flexibility and scalability for next-generation systems, while maintaining software compatibility with existing PCI applications. Compared to legacy PCI, the PCI Express protocol is considerably more complex, with three layers—the transaction, data link and physical layers.

In a PCI Express system, a root complex device connects the processor and memory subsystem to the PCI Express midpoint device fabric comprised of zero or more midpoint devices. These midpoint devices are commonly referred to as "switches", although they can include functionality not found in traditional switches. Nevertheless, the term "switches" as used throughout this disclosure shall be interpreted broadly to mean any midpoint device that handles communications among multiple ports.

In PCI Express, a point-to-point architecture is used. Similar to a host bridge in a PCI system, the root complex generates transaction requests on behalf of the processor, which is interconnected through a local I/O interconnect. Root complex functionality may be implemented as a discrete device, or may be integrated with the processor. A root complex may contain more than one PCI Express port and multiple midpoint devices can be connected to ports on the root complex or cascaded.

When initializing a link at the physical layer of one of the ports of a PCI Express switch, a Link Training & Status State Machine (LTSSM) is utilized. The LTSSM essentially acts as a physical layer controller. It establishes each link between the PCI Express switch and another device. Part of this involves determining how wide each link is going to be. How wide a link can be depends on the number of lanes the switch has available as well as the number of lanes the link partner (the device to which the switch is attempting to connect) has available.

Figure 1:
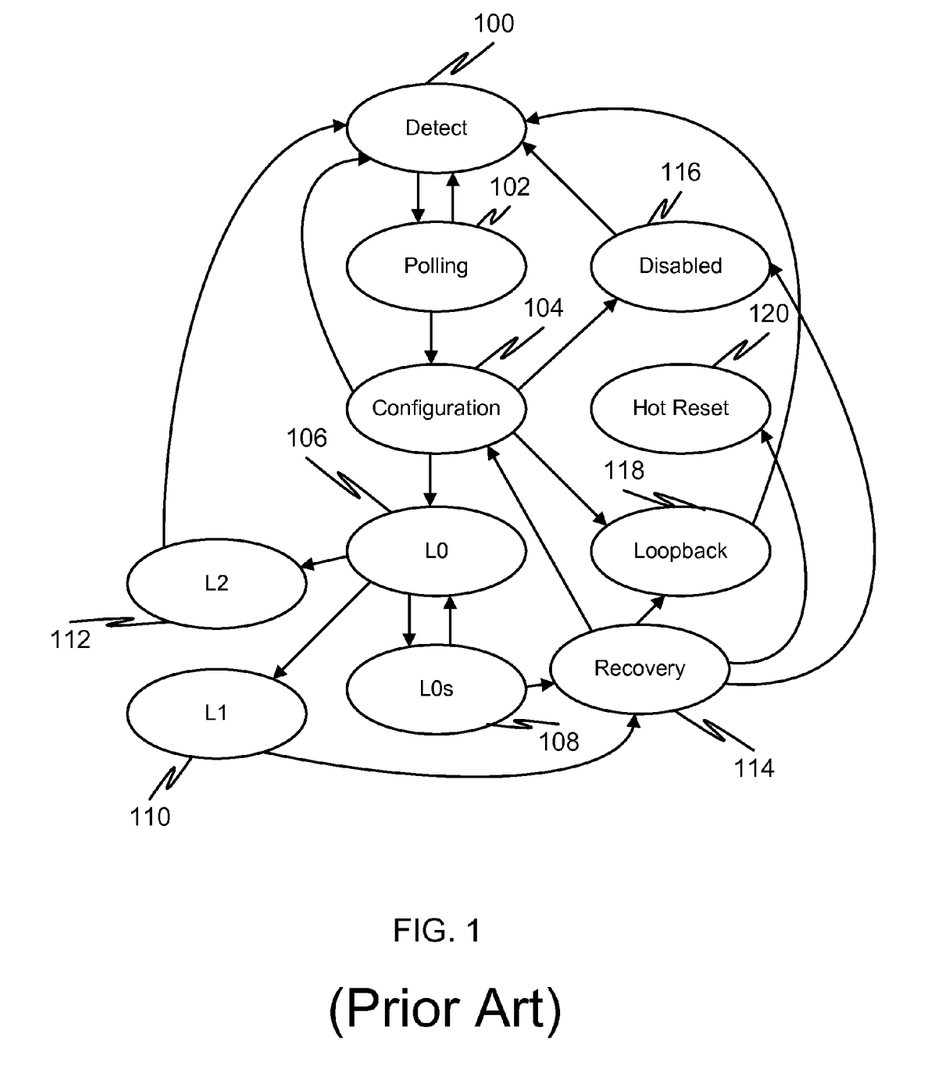
FIG. 1 is a diagram illustrating the states of a traditional LTSSM.

FIG. 1 is a diagram illustrating the states of a traditional LTSSM. Prior to entering these states, the switch will determine how many links to attempt to establish. Then, for each link to attempt to establish, a link request will be sent out on all available lanes. The link partners respond to these link requests by sending back information on how many lanes are available on the link partner side. When the first such response is received by the switch, the switch starts an LTSSM for that particular link. A detect state 100 is used to detect when a far end termination is present. Then a polling state 102 transmits training ordered sets and responds to training ordered sets that are received. In this state, bit lock and symbol lock are established, lane polarity is configured, and lane data rate is established. The polling state 102 also includes a polling compliance sub-state, that is used to determine if the transmitter and the interconnect is compliant with voltage and timing specifications.

In a configuration state 104, both the transmitter and receiver are sending and receiving data at the negotiated data rate. The lanes of a port are configured into a link through a width and lane negotiation sequence. Additional configuration details can be configured during this state. Once this is completed, the state machine can progress to L0 106, which is the normal operating state where data and control packets can be transmitted and received. Various power management states can be entered from this state, including L0s 108, L1 110, and L2 112. Additional available states include recovery 114 (where a link can re-establish bit lock, symbol lock, and lane-to-lane de-skew), disabled 116 (where a link is disabled), loopback 118 (used for test and fault isolation), and hot reset 120 (used to reset the state machine).

Following the configuration state 104, the switch then will start an LTSSM for one of the remaining links to establish (if any). That LTSSM then proceeds through all of its states until the configuration state is completed, at which point the switch then proceeds to start another LTSSM for another of the remaining links to establish. This process repeats until all links have been established.

While this kind of state machine operates effectively in prior art devices, it does not operate all that efficiently when configuring multiple ports simultaneously. Specifically, configuring multiple ports currently requires running through the state machine for each port, waiting until the last port is completely configured (entered state L0) before proceeding to the next port. Thus, for an 8 port configuration, the system must run through the state machines for all 8 ports before configuration is done. Even if all these state machines require the same time to configure, it still results in taking eight times as long as configuring a single port. Additionally, in real world environments, some state machines can take significantly longer to configure than others, which can slow down the entire process and delay proceeding to the next port configuration.

What is needed is a solution that does not suffer from these issues.

SUMMARY OF THE INVENTION

In a first embodiment of the present invention, a method for configuring a plurality of input/output (I/O) interconnect switch ports is provided, the method comprising: starting a link training and status state machine (LTSSM) for each of the plurality of ports; placing each of the LTSSMs in a receiver detect state; changing all of the LTSSMs to a polling state only once receivers are detected or timeouts occur in the receiver detect states in each of the LTSSMs; changing all of the LTSSMs to a configuration state only once polling is successful or timeouts occur in the polling states in each of the LTSSMs; and completing the configuration state of each of the LTSSMs.

In a second embodiment of the present invention, a method for configuring a plurality of links on a switch is provided, the method comprising: sending a link request for each of the plurality of links, wherein the link requests each include information regarding a number of lanes requested for the corresponding link; detecting that a plurality of link requests have been successful; and starting a plurality of LTSSMs in parallel, wherein each of the LTSSMs corresponds to a different successful link request.

In a third embodiment of the present invention, a switch is provided comprising: a plurality of ports; a plurality of LTSSMs; and a processor configured to: start an LTSSM for each link to establish on the plurality of ports; place each of the started LTSSMs in a receiver detect state; advance all of the started LTSSMs to a polling state once the receiver detect states for all of the LTSSMs have completed;

In a fourth embodiment of the present invention, a computer readable medium for storing in non-transitory tangible form computer instructions executable by a processor for configuring a plurality of ports in a switch is provided, the method comprising: starting a link training and status state machine (LTSSM) for each of the plurality of ports; placing each of the LTSSMs in a receiver detect state; changing all of the LTSSMs to a polling state only once receivers are detected or timeouts occur in the receiver detect states in each of the LTSSMs; changing all of the LTSSMs to a configuration state only once polling is successful or timeouts occur in the polling states in each of the LTSSMs; and completing the configuration state of each of the LTSSMs.

DETAILED DESCRIPTION OF SPECIFIC EMBODIMENTS

Reference will now be made in detail to specific embodiments of the invention, including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention may also be tangibly embodied as a set of computer instructions stored on a computer readable medium, such as a memory device.

In an embodiment of the present invention, timeouts in the detect and polling states of LTSSMs are taken advantage of to synchronize all available LTSSMs on a device. Externally it appears as if one LTSSM is operating. A centralized port accumulation logic uses returned link numbers to determine which LTSSMs should continue to operate after the configuration state and also informs the data link and transaction layers of the external port configuration. In this manner, a number of ports that can be created in a single pass is limited only by the number of available LTSSMs. For example, if there are 8 LTSSMs available in the design, then 8 ports can be configured in a single pass (assuming all LTSSMs are available), whereas in the past such a configuration would take 8 passes. In that manner, the speed of configuring multiple ports via LTSSMs is greatly improved, taking only as long as the slowest LTSSM takes to configure its port. As an example, a prior art method may take 64 microseconds multiplied by the number of LTSSMs in order to establish a number of links, whereas the present invention may only take 64 microseconds overall in order to establish the same number of links.

Figure 2:
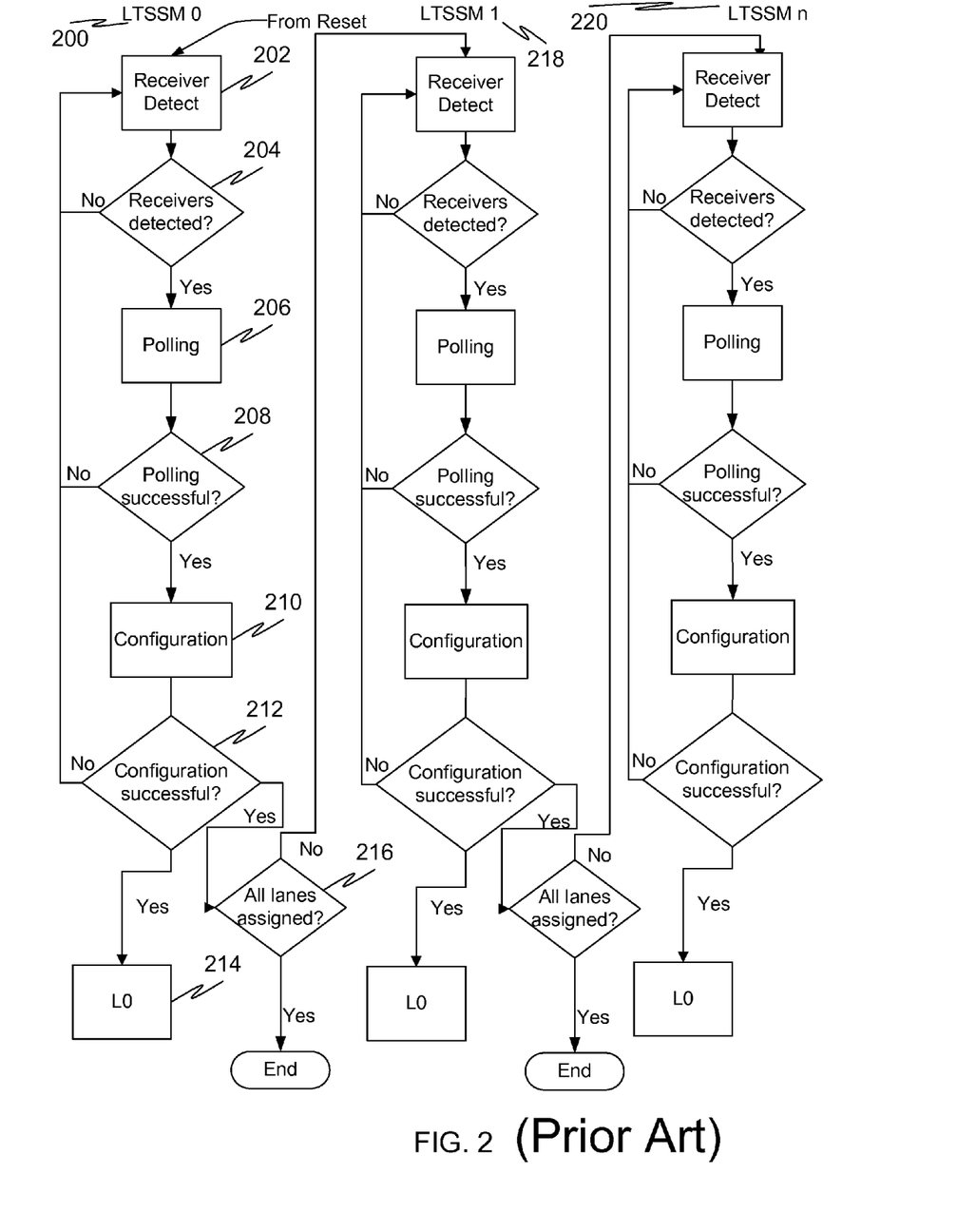
FIG. 2 is a diagram illustrating a standard mechanism for configuring multiple ports in a device using LTSSMs.

FIG. 2 is a diagram illustrating a standard mechanism for configuring multiple ports in a device using LTSSMs. This mechanism is the one utilized by the current embodiment of the PCI Express Specification. For simplicity, only the detect, polling, configuration, and L0 states are depicted. Here, for a first LTSSM 200, a receiver detect 202 state is entered. At 204, it is determined if any receivers are detected. This is performed after a predetermined timeout period. Thus, if no receivers have been detected by the end of the timeout period, the process loops back to 202. If a receiver is detected, then LTSSM 200 enters a polling state 206. Polling state attempts to poll the receiver, and if polling is successful at 208, the process proceeds to configuration state 210. If polling has not been successful after a predetermined timeout period has expired, then the process loops back to 202.

At 212, it is determined if configuration has been successful. If not, and a predetermined timeout period has expired, then the process loops back to 202. Otherwise, if the configuration has been successful, two things occur: the LTSSM 200 enters state L0 214, and the process then also proceeds to 216, where it is determined if all lanes have been assigned. If so, the process ends. If not, then a second LTSSM 218 is begun.

This second LTSSM 218 operates in the same way as the first LTSSM 200, and after the second LTSSM 218 has completed its configuration, then a third LTSSM 220 can be started if all the lanes have not yet been assigned. This can continue until all lanes have been assigned, or until there are no more available LTSSMs.

Figure 3:
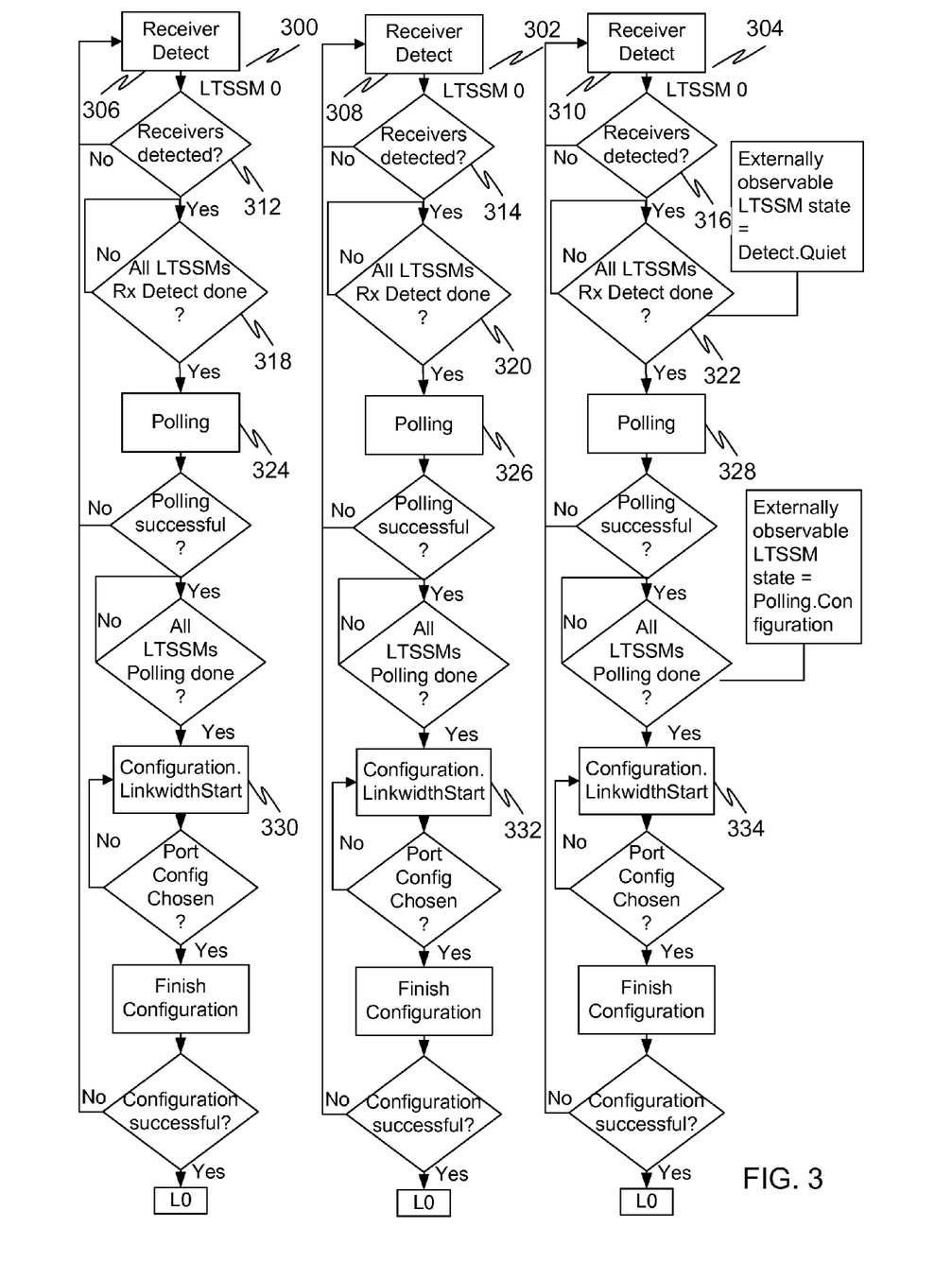
FIG. 3 is a diagram illustrating a mechanism for configuring multiple ports in a device using LTSSMs in accordance with an embodiment of the present invention.

FIG. 3 is a diagram illustrating a mechanism for configuring multiple ports in a device using LTSSMs in accordance with an embodiment of the present invention. Here, rather than run the LTSSMs one at a time like in FIG. 2, all of the available LTSSMs are run simultaneously. Thus, the process begins by placing LTSSM 300, LTSSM 302, and LTSSM 304 into receiver detect states 306, 308, and 310, respectively. The processes proceed to determine whether receivers are detected 312, 314, and 316, respectively. At 318, 320, and 322, respectively, once a receiver is detected, it is determined if all the LTSSM's receiver detection steps completed. In other words, steps 318, 320, and 322 only proceed to polling state 324, 326, and 328, respectively, once all of the LTSSMs 300, 302, and 304 have detected receiver. It should be noted that, while it is not pictured, for a particular LTSSM, if no receiver is detected after a timeout period, the system proceeds as if one had been detected, at least insofar as progressing the other LTSSM to their next state. Thus, the parallel processes pause to allow all of them to finish the receiver detection state (whether via detection of a receiver, or via timeout) before moving on to the polling state.

The polling states 324, 326, 328 work similarly, with the LTSSMs 300, 302, and 304 each pausing until the polling for all of the LTSSMs 300, 302, and 304 have completed, prior to moving on to the configuration states 330, 332, 334. It should be noted that, while it is not pictured, for a particular LTSSM, if the polling has not been successful after a timeout period, the system proceeds as if it had been successful, at least insofar as progressing the other LTSSM to their next state. The idea is that all LTSSMs will enter their configuration states 330, 332, and 334 at the same time, and thus will all present their link numbers at the same time. It should also be noted that in some embodiments, the polling state is comprised of two or more substates. One of these substates can be polling.config, and in such a case, it is this polling.config substate that is monitored and the LTSSMs do not progress beyond the polling.config state until all LTSSMs have finished their polling.config substates.

Once in the configuration states 330, 332, 334, the LTSSMs 300, 302, 304, respectively are all operated normally, as each LTSSM 300, 302, 304 can complete configuration at its own pace without reference to the others.

It should be noted that while the present disclosure has discussed the invention in terms of PCI Express, it can be extended to other standards as well. For example, in one embodiment, Gigabit Ethernet switches may utilize a similar process to establish Gigabit Ethernet links in parallel. As an example, the PCIe specification allowed port widths of only 1, 2, 4, 8, 12, 16, or 32 lanes, allowing the present invention to be applied to any number of LTSSMs controlling up to 32 lanes. However, non-PCIe embodiments are foreseen that are not so limited.

Figure 4:
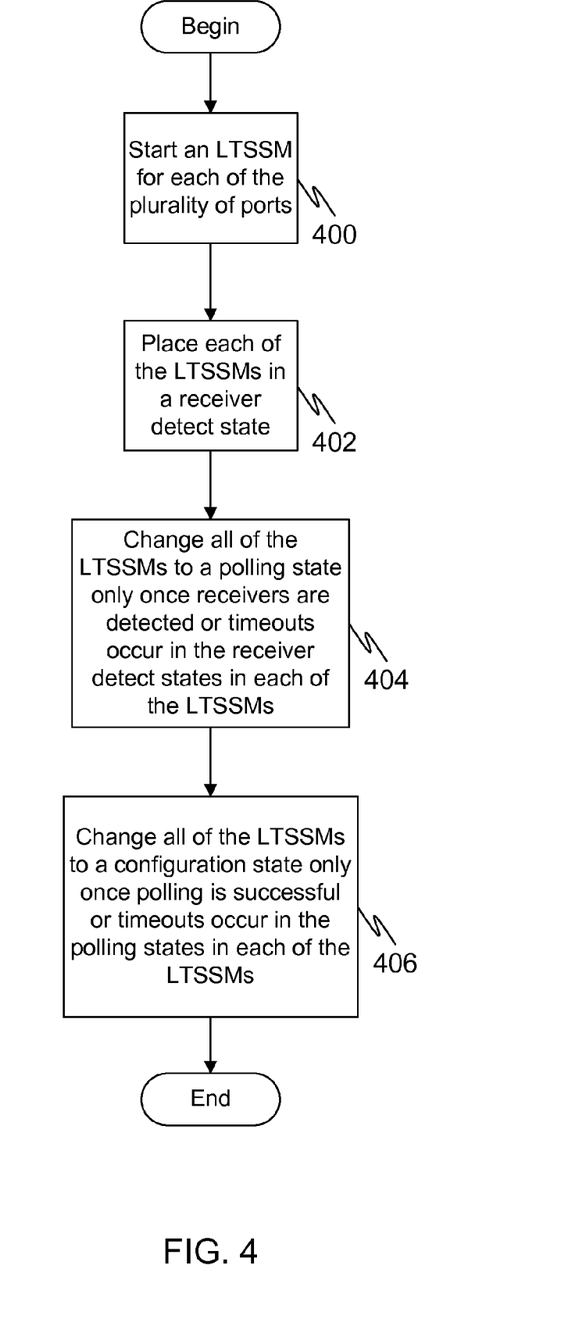
FIG. 4 is a flow diagram illustrating a method for configuring a plurality of input/output interconnect switch ports in accordance with an embodiment of the present invention.

FIG. 4 is a flow diagram illustrating a method for configuring a plurality of input/output interconnect switch ports in accordance with an embodiment of the present invention. At 400, an LTSSM is started for each of the plurality of ports. Starting an LTSSM may include obtaining a count of available LTSSMs and then, if the count is less than the number of ports being requested, only starting a number of LTSSMs equal to the count. At 402, each of the LTSSMs is placed in a receiver detect state. At 404, all of the LTSSMs are changed to a polling state only once receivers are detected or timeouts occur in the receiver detect states in each of the LTSSMs. It should be noted that the polling state in this embodiment may be a polling configuration state. At 406, all of the LTSSMs are changed to a configuration state only once polling is successful or timeouts occur in the polling states in each of the LTSSMs. In one embodiment of the present invention, this timeout is 12 ms long. At the configuration state, each of the LTSSMs can progress to other states without regard for the others of the LTSSMs.

Figure 5:
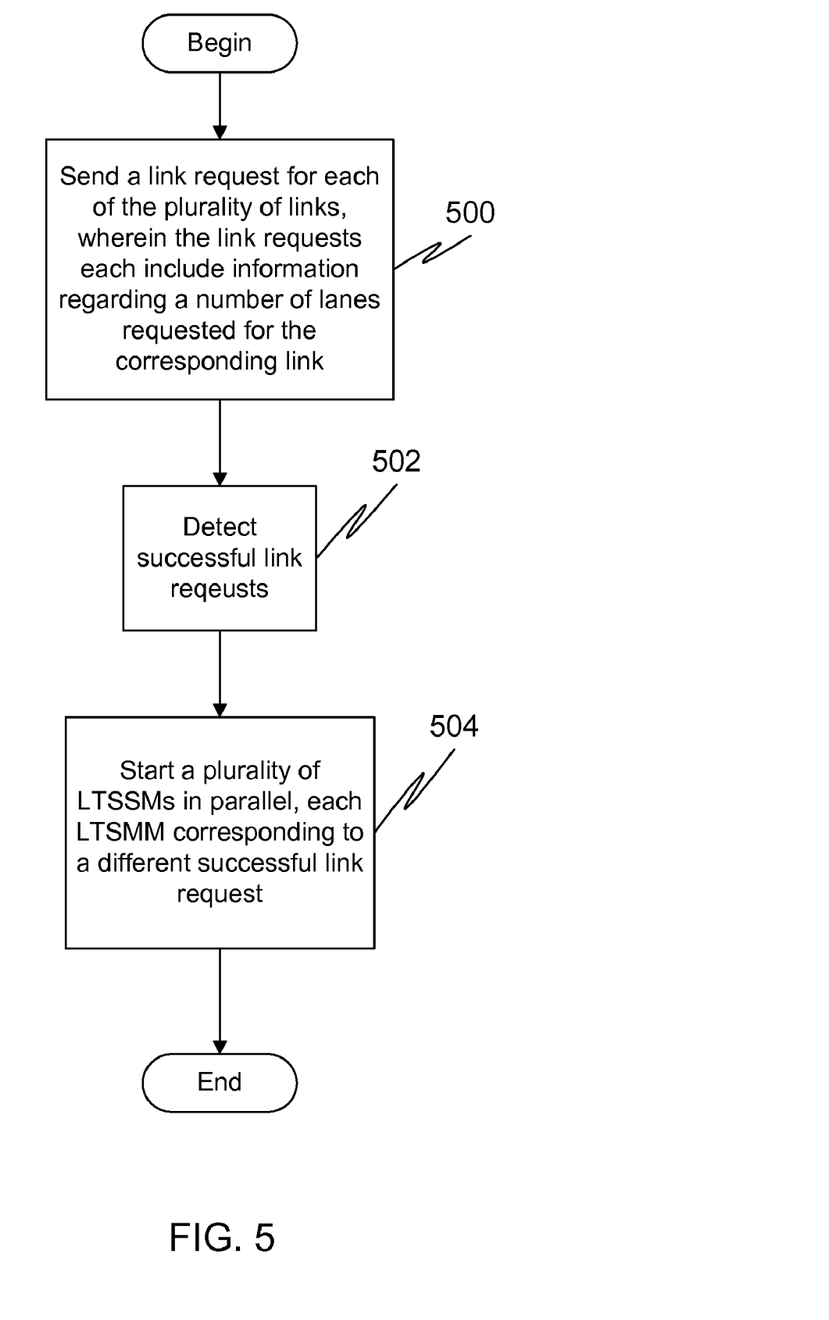
FIG. 5 is a flow diagram illustrating a method for configuring a plurality of links on a switch in accordance with another embodiment of the present invention.

FIG. 5 is a flow diagram illustrating a method for configuring a plurality of links on a switch in accordance with another embodiment of the present invention. At 500, a link request is sent for each of the plurality of links, wherein the link requests each include information regarding a number of lanes requested for the corresponding link. At 502, successful link requests are detected. At 504, a plurality of LTSSMs are started in parallel. Each of the LTSSMs corresponds to a different successful link request. In one of the embodiments, progression from two of the states of each LTSSM is delayed until the same state is completed for all of the LTSSMs. A state may be completed either by completion actions taken during the state (such as detecting a receiver, or receiving a polling completion indication), or by the expiration of a timeout period.

By operating the LTSSMs in parallel, the configuring of multiple ports can occur much faster than in prior art devices. Indeed, the maximum time to configured multiple ports is determined by the slowest single LTSSM as opposed to a multiple of the number of LTSSMs. This significant increase in speed increases the efficiency of switches operating LTSSMs, and has specific benefits in PCIe and Gigabit Ethernet switches.

Figure 6:
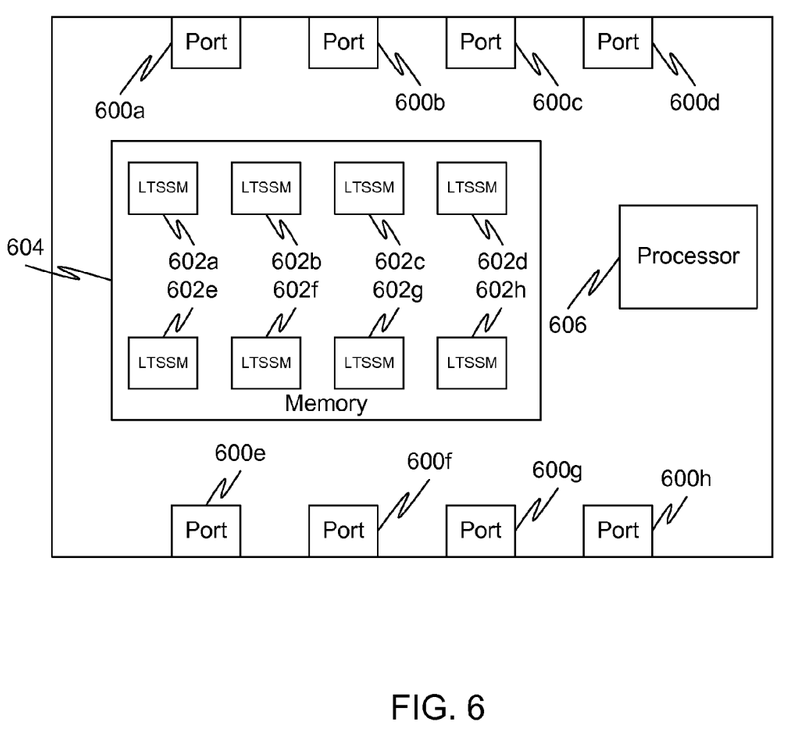
FIG. 6 is a block diagram illustrating a switch in accordance with an embodiment of the present invention.

FIG. 6 is a block diagram illustrating a switch in accordance with an embodiment of the present invention. This switch may be, for example, a PCIe switch, or a Gigabit Ethernet switch. The switch includes a plurality of ports 600a-600h. Additionally, a plurality of LTSSMs 602a-602h can be provided. It should be noted that the LTSSMs are virtual state machines, not physical ones, and thus their depiction in this figure is not intended to imply that the LTSSMs are physical in nature. The LTSSMs may be stored in memory 604 and operated by a processor 606. Processor 606 generally undertakes the actions described above with respect to FIG. 4 or FIG. 5, among other actions. It should be noted that in this figure one processor 606 is depicted, however embodiments are foreseen wherein multiple processors share the tasks of the switch. Indeed, embodiments are possible wherein each LTSSM has its own dedicated processor.

it should also be noted that embodiments are described herein that involve the delaying of movement to subsequent states until all LTSSMs have completed the receiver detect and polling states. Nevertheless, embodiments are foreseen wherein the same delay is applied to other states as well, or alternative states to the receiver detect and polling states, allowing the present invention to apply to many different types of LTSSM, not merely the LTSSMs typically utilized by PCIe switches.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for configuring a plurality of input/output (I/O) interconnect switch ports, the method comprising:

starting a link training and status state machine (LTSSM) for each of the plurality of ports;

placing each of the LTSSMs in a receiver detect state;

changing all of the LTSSMs to a polling state only once receivers are detected or timeouts occur in the receiver detect states in each of the LTSSMs;

changing all of the LTSSMs to a configuration state only once polling is successful or timeouts occur in the polling states in each of the LTSSMs; and completing the configuration state of each of the LTSSMs.

2. The method of claim 1, wherein the LTSSMs can progress from the configuration state to other states without regard for others of the plurality of LTSSMs.

3. The method of claim 1, wherein the starting includes:

obtaining a count of available LTSSMs on the I/O interconnect switch;

if the count of available LTSSMs is less than the number of the plurality of ports, then only starting a number of LTSSMs equal to the count.

4. The method of claim 1, wherein the polling state is a polling configuration state.

5. A method for configuring a plurality of links on a switch, the method comprising:

sending a link request for each of the plurality of links, wherein the link requests each include information regarding a number of lanes requested for the corresponding link;

detecting that a plurality of link requests have been successful; and starting a plurality of LTSSMs in parallel, wherein each of the LTSSMs corresponds to a different successful link request, wherein each of the LTSSMs comprise a plurality of states, wherein for at least one of the states, progression to a successive state is delayed until the same state is completed for all the LTSSMs.

6. The method of claim 5, wherein a state is completed if actions taken during the state are successful or if a timeout period is reached.

7. The method of claim 5, wherein the switch is a Gigabit Ethernet switch.

8. The method of claim 5, wherein the at least one of the states includes a receiver detect state.

9. The method of claim 8, wherein the at least one of the states also includes a polling state.

10. A switch comprising:

a plurality of ports;

a plurality of LTSSMs;

a processor configured to:

start an LTSSM for each link to establish on the plurality of ports;

place each of the started LTSSMs in a receiver detect state;

advance all of the started LTSSMs to a polling state once the receiver detect states for all of the LTSSMs have completed; and advance all of the started LTSSMs to a configuration state once the polling states for all of the LTSSMs have completed.

11. The switch of claim 10, wherein the switch is a Gigabit Ethernet switch.

12. The switch of claim 10, wherein the switch is an I/O interconnect switch.

13. The switch of claim 10, wherein a receiver detect state has completed once a receiver is detected or a timeout is reached.

14. The switch of claim 10, wherein a polling state has completed once a polling success message is received or a timeout is reached.

15. A non-transitory computer readable medium for storing in non-transitory tangible form computer instructions executable by a processor for configuring a plurality of ports in a switch, the method comprising:

starting a link training and status state machine (LTSSM) for each of the plurality of ports;

placing each of the LTSSMs in a receiver detect state;

changing all of the LTSSMs to a polling state only once receivers are detected or timeouts occur in the receiver detect states in each of the LTSSMs;

changing all of the LTSSMs to a configuration state only once polling is successful or timeouts occur in the polling states in each of the LTSSMs; and completing the configuration state of each of the LTSSMs.

16. The non-transitory computer readable medium of claim 15, wherein when the configuration state of a particular LTSSM is completed, the particular LTSSM advances to a subsequent state without regard for the other of the LTSSMs.

17. The non-transitory computer readable medium of claim 15, wherein the switch is a switch configured in accordance with the PCI Express standard.

18. The non-transitory computer readable medium of claim 15, wherein the processor is further configured to detect completion of a link request message for one of the plurality of ports prior to starting a LTSSMs for the one of the plurality of ports.

* * * * *